(12) United States Patent
Hanson

(10) Patent No.: X6202
(45) Date of Patent: Oct. 20, 1830

(54) WHEELS, FELLOES, SAWING

(76) Inventor: David D. Hanson

David D. Hanson, of Ware, New Hampshire

Letters Patent.

The schedule referred to in these Letters Patent & making part of the same, containing a description in the words of the said David D. Hanson himself of his improvement in the Machine for sawing Fellows, for Carriage Wheels ------- To all to whom these Presents shall come, Be it known that I David D. Hanson, of Ware in the county of Hillsborough and State of New Hampshire, have invented a new and useful improvement in the Machine for sawing Fellows for Carriage Wheels and that the following is a full and exact description of the construction and operation of the said Machine as improved by me. — The improved Machine for sawing Fellows for Carriage Wheels, consists of a frame, four feet long two feet two inches wide and six feet high, composed of four posts, three long and two short girths and two cap pieces two of the long girths corresponding with the length of the frame, are framed into the posts, three inches from the bottom, the other is framed into the back posts at the height of three feet from the bottom girth The cap pieces may be four feet five inches long, and framed to the top of the posts, The short girts, corresponding with the width of the frame, are framed, two of them one and a half inch from the bottom side girt, the other two one and a half inch below, the cap pieces, There are three fender posts five feet nine inches long, each, one of which is locked or halved onto the centre of the back cap piece and the two girts on the inside of the frame below in which is a groove, one and an eighth inch wide and three fourths of an inch deep, In this groove or slant, the back post of the saw gate moves, The other two fender posts are framed in-to the inside cap piece above, and the long girt below, and stand perpendicularly at the distance of an inch and a quarter apart. In this space the arms of the saw gate move. These two fender posts are grooved on the front side one inch deep and threefourths wide for the purpose of admitting the front or inner saw gate post this post is one and aquarter inch thick and two and a half inches wide and two feet nine inches long. and fills the space made by the grooving in the posts. The arms of the saw gate extend in front of the forward or front fender posts the upper arm seven inches and the lower eight between these extended arms the two saws are placed, to the lower arm the sweep or whip staff is attached which connects the saw gate with the crank below. The back saw gate post is also attached to another sweep connecting it with another crank below. The saw gate being thus opera -ted by two cranks is one of the improvements in this Machine its usefulness consisting in the greater stability and steadyness with which the saw gate moves than it possibly could be if operated by a single crank. the cranks are operated by a pulley and band placed centrally between them, & secured by puppet heads. — Extending in front of the frame herein before described, is another frame four feet long, twenty two inches wide, and three feet three inches high, it is composed of two lower girts, two posts, a cap piece. two strick sills & two long braces The strick sills are about six feet long are framed into the front or last mentioned cap piece and ex -tend [illegible] & framed into the 2nd back girt of the first mentioned frame, — From the cap piece into which they are framed these sills are five inches square and one inch apart. as far back as the circular head block, beyond or back of which, they are five by three inches & locked on to the front fender posts, leaving a space of about five inches between them, in which the saw gate operates. These sills are supported by a long brace on each side, — in front of the circular head block and on the upper sides of the strick sills a grooving is made in the interior corners, about one inch or more square in which a slide about three inches wide, moves horizontally near the end of this slide, next to the saw is an iron pivot half an inch in diameter passing through the slide up and down, secured on the top by an iron plate thro' which it passes, about three inches square and under the stretch sills by a screw and hand nut to hold the slide wherever it may be placed, Immediately in front of the circular head block extending across the top of the stretch sills and the long braces, is placed a circular floor piece about three feet or more in length seven inches wide and one and a half inch thick On this floor a circular slide of cast iron, or other metal moves, It is called the feed slide, it is two inches wide and half an inch thick with teeth on its outer edge it is operated by a cog wheel one and a half or two inches in diameter the teeth of which corres-ponds with the teeth of the feed slide, - It is placed upon an upright shaft, at the lower end of which is a rag wheel fifteen or sixteen inches in diameter, - This rag wheel is operated by a band playing over an oval wheel on the crank shaft - the band being connected with a roller operating a sweep which operates said wheels This wheel is stayed by a hand or click, on the opposite side The pivot in the upper end of the upright shaft of the rag and cog wheels plays in a moveable box secured to the under sides of the head block which box is operated by a slide used for gearing or ungearing the feed slide The feed slide and the machinery operating it, are claimed as improvements, and are useful in regulating the feed of the saws according to the thickness or hardness of the material to be sawed The pivot before mentioned placed in the slide in front of the circular head block, & which may be called the slide pivot or centre pin, is always placed at a distance from the back saw, equal to half the diameter of the wheel for which the fellows to be sawed are intended and may be moved to a greater or less distance at pleasure and secured firmly in its place by the hand nut below, or under neath the stick sills, —

On this pivot or center pin moves a sweep three feet long and 8 inches or more in width thro' which a double slant and grooving is cut about twenty inches long. in one of which slants or grooves, is a moveable box, or tube, thro' which the aforesaid pivot passes, — — It may be made fast in any part of the slant, by a screw nut. On this sweep is fixed a moveable vice for the purpose of holding the plank, or other material to be sawed. It is secured to the sweep by means of groovy ledges & is made fast to any particular place by a hand nut and screw playing in one of the slants, thro' the sweep. the plank or timber to be sawed is held in its place by the vice aided by a guage pulley on each side of the saw. The sweep here mentioned together with the vice and guage, pulleys are claimed as improvements in this Machine, also the extended arms of the saw gate, This Machine may be operated by hand, by horse, water, or Steam power, and as improved will saw with greater expedition, will saw fellies of a greater variety of sizes, and with less labour, in its management than heretofore. — It will saw fellows of any size for carriage wheels from one to six or seven inches wide and of any diameter Witnesses Abbe Cady }
Amos Chase }

David D. Hanson

E4°. chfW.

1416 27 8—